United States Patent
Kang et al.

(10) Patent No.: US 6,816,474 B2
(45) Date of Patent: Nov. 9, 2004

(54) METHOD AND SYSTEM FOR EFFICIENTLY ACQUIRING CDMA BASED OVERHEAD CHANNEL DATA FRAMES

(75) Inventors: Inyup Kang, San Diego, CA (US); Mark D. Levin, San Diego, CA (US); Arthur J. Neufeld, Longmont, CO (US)

(73) Assignee: Qualcomm Incorporated, San Diego, CA (US)

( * ) Notice: Subject to any disclaimer, the term of this patent is extended or adjusted under 35 U.S.C. 154(b) by 125 days.

(21) Appl. No.: 10/366,039

(22) Filed: Feb. 13, 2003

(65) Prior Publication Data

US 2004/0001515 A1 Jan. 1, 2004

Related U.S. Application Data

(60) Provisional application No. 60/392,748, filed on Jun. 28, 2002.

(51) Int. Cl.[7] .............................................. H04B 7/216
(52) U.S. Cl. ........................ 370/335; 370/441; 455/12.1
(58) Field of Search ................................. 370/208, 209, 370/277, 279, 320, 324, 326, 335, 342, 441, 492; 455/12.1, 450, 427

(56) References Cited

U.S. PATENT DOCUMENTS

| | | | |
|---|---|---|---|
| 5,309,474 A | | 5/1994 | Gilhousen et al. .............. 375/1 |
| 5,634,190 A | * | 5/1997 | Wiedeman .................. 455/13.1 |
| 6,628,921 B1 | * | 9/2003 | Vaddiparty et al. ........ 455/12.1 |
| 2001/0019576 A1 | | 9/2001 | Nystrom et al. ............ 375/136 |
| 2001/0021179 A1 | | 9/2001 | Tiedemann, Jr. et al. ... 370/333 |

* cited by examiner

*Primary Examiner*—Kwang Bin Yao
*Assistant Examiner*—Alexander O. Boakye
(74) *Attorney, Agent, or Firm*—Philip Wadsworth; Charles D. Brown; Howard H. Seo

(57) ABSTRACT

Provided is a system and method for constructing a data message in a communications device including a processor configured to process sequentially transmitted messages. Each of the messages requires a predetermined number of data frames. The technique of the instant invention includes receiving portions of at least two of the transmitted messages in the processor. Each of the at least two received portions includes a subset of the predetermined number of data frames and excludes a remainder of the predetermined number of data frames. The subset of one of the received portions substantially matches the remainder of the other portion. Next, a determination is made as to whether a total number of the received subsets equals the predetermined number. Finally, a synthesized messaged is produced when the total number of the subsets is at least equal to the predetermined number. The synthesized message is formed of a combination of the subsets from each of the received portions.

44 Claims, 9 Drawing Sheets

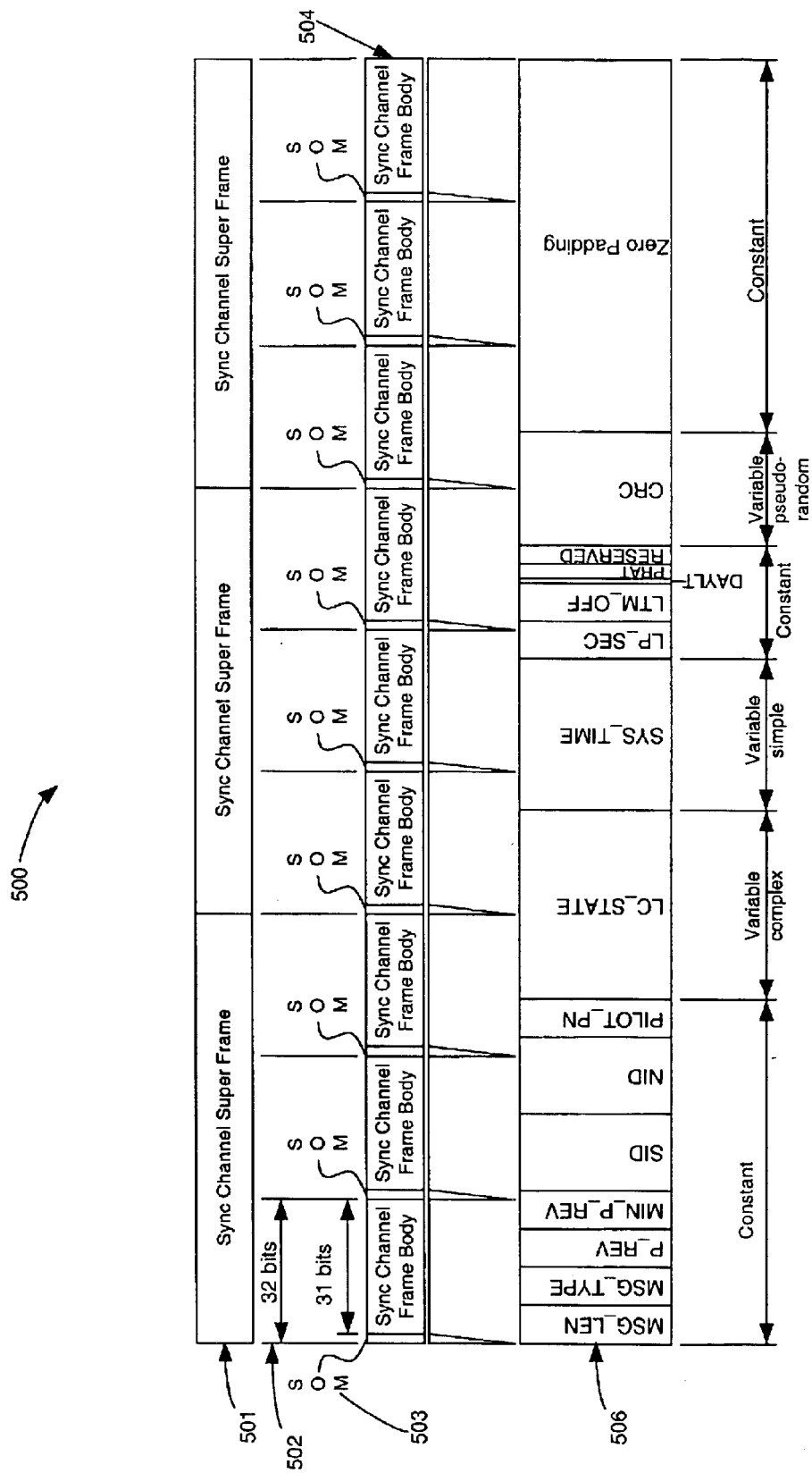
FIG. 5
(conventional)

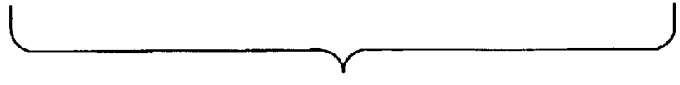
FIG. 6
(conventional)

METHOD AND SYSTEM FOR EFFICIENTLY ACQUIRING CDMA BASED OVERHEAD CHANNEL DATA FRAMES

RELATED APPLICATIONS

This application claims the benefit of provisional U.S. Application Ser. No. 60/392,748, entitled "Method and System for Efficiently Acquiring CDMA Based Overhead Channel Data Frames," filed on Jun. 28, 2002, assigned to the assignee of the present application, and incorporated herein by reference in its entirety for all purposes.

BACKGROUND

1. Field

The present invention generally relates to wireless communications networks. More particularly, the present invention relates to a system and method for synchronizing timing in application specific integrated circuits (ASICs) associated with wireless communication terminals.

2. Related Art

Code division multiple access (CDMA) is one of several modulation techniques for facilitating communications in which a large number of system users are present. Although other techniques, such as time division multiple access (TDMA), frequency division multiple access (FDMA) and AM modulation schemes such as amplitude companded single sideband (ACSSB) are known, CDMA has significant advantages over these other modulation techniques.

The use of CDMA techniques in a multiple access communication system is disclosed in U.S. Pat. No. 4,901,307, entitled "Spread Spectrum Multiple Access Communication System Using Satellite or Terrestrial Repeaters" and U.S. Pat. No. 5,103,459, entitled "System and Method for Generating Signal Waveforms in a CDMA Cellular Telephone System", both of which are assigned to the assignee of the present invention and are incorporated by reference. The method for providing CDMA mobile communications was standardized in the United States by the Telecommunications Industry Association in TIA/EIA/IS-95-A entitled "Mobile Station-Base Station Compatibility Standard for Dual-Mode Wideband Spread Spectrum Cellular System", referred to herein as IS-95.

In the above patents, CDMA techniques are disclosed in which a large number of mobile station users, each having a transceiver, communicate through satellite repeaters or terrestrial base stations. The satellite repeaters are known as gateways and the terrestrial base stations are known as cell base stations or cell-sites. The gateways provide communication links for connecting a user terminal to other user terminals or users of other communications systems, such as a public telephone switching network. By using CDMA communications, the frequency spectrum can be reused multiple times thus permitting an increase in system user capacity. The use of CDMA techniques result in much higher spectral efficiency than can be achieved using other multiple access techniques.

In a typical CDMA communications systems, both the remote units and the base stations discriminate the simultaneously received signals from one another via modulation and demodulation of the transmitted data with high frequency pseudo-noise (PN) codes, orthogonal Walsh codes, or both. For example, in the forward link, i.e., base station to mobile station direction, IS-95 separates transmissions from the same base station by the use of different Walsh codes for each transmission, while the transmissions from different base stations are distinguished by the use of PN codes uniquely offset in phase. In the reverse link, i.e., mobile station to base station direction, different PN sequences are used to distinguish different channels.

The forward CDMA link includes a pilot channel, a synchronization (sync)-channel, several paging channels, and a larger number of traffic channels. The reverse link includes an access channel and a number of traffic channels. The pilot channel transmits a beacon signal, known as a pilot signal, and is used to alert mobile stations of the presence of a CDMA compliant base station. After a mobile station has successfully acquired the pilot signal, it can then receive and demodulate the sync-channel in order to achieve frame level synchronization and system time etc. This feature will be discussed in greater detail below. The paging channel is used by the base station to assign communication channels and to communicate with the mobile station when the mobile station has not been assigned to a traffic channel. Finally, the traffic channels, assigned to individual mobile stations, are used to carry user communications traffic such as speech and data.

To communicate properly in a CDMA system, the state of the particular codes selected must be synchronized at the base station and the mobile station. Code level synchronization is achieved when the state of the codes at the mobile station system are the same as those in the base station, less some offset to account for any processing and transmission delay. In IS-95, this code level synchronization is facilitated by the transmission of the pilot signal from each base station which is comprised of the repeated transmission of the uniquely offset PN code (pilot PN code). In addition to facilitating synchronization at the pilot PN code level, the pilot channel also provides for identification of each base station relative to the other associated base stations using the base station's pilot channel phase offset.

After a mobile station achieves PN code level synchronization, as stated above, it can receive and demodulate the sync channel. The synch channel carries a repeating message that specifically identifies the base station, provides system level timing, and provides the absolute phase of the pilot signal.

SUMMARY

Consistent with the principles of the present invention as embodied and broadly described herein, an exemplary circuit includes a first communications device including at least first and second type communication paths. The first communications device is adapted to (i) receive first and second timing signals in the first type communication path and (ii) transmit data on the second type communication path. The data is transmitted in association with the received first timing signal. Next, the circuit includes a processor electrically coupled to the first communications device and configured to (i) receive the second timing signal and (ii) produce a timing word from the second timing signal. Finally, the circuit includes a second communications device including at least a first type communication path. The second communications device is coupled to the processor and adapted to receive the timing word therefrom and is configurable to receive the transmitted data and derive synchronization information therefrom. The derived synchronization information is related to the first timing signal. The second communications device also performs one or more operations in accordance with the received second timing signal and the derived synchronization information.

Features and advantages of the present invention include the ability to enhance the speed with which remotely located terminals achieve synchronization in a system where synchronization is based upon a message being repeatedly transmitted from a centralized unit to the remote terminals. By enhancing the speed of synchronization, the amount of time the remote terminal is out of service can be reduced. Additionally, the unit may operate in a lower power mode, thus facilitating a reduction in overall power consumption once synchronization has been achieved. The time savings achievable by this process amount to an average, for example, of approximately 300 ms. This in turn implies the time a mobile station is out of service due to a system loss can also be 300 ms less for each synchronization cycle. The net result is an overall savings of at least eight minutes of standby mobile phone time every hour, when the mobile phone is operating in a non-preferred system. In the non-preferred system, the total mobile phone standby time is increased by about 13%. If, for example, the mobile phone is operating in a system that experiences frequent system losses, the increase in standby time could be even higher.

BRIEF DESCRIPTION OF THE FIGURES

The accompanying drawings, which are incorporated in and constitute a part of the specification, illustrate an embodiment of the invention and, together with the description, explain the purpose, advantages, and principles of the invention. In the drawings:

FIG. 5 is an illustration of a conventional synch channel message;

FIG. 6 is an illustration of the message fields associated with the message of FIG. 5;

DETAILED DESCRIPTION

The following detailed description of the present invention refers to the accompanying drawings that illustrate exemplary embodiments consistent with this invention. Other inventions are possible, and modifications may be made to the embodiments from the spirit and scope of the invention. Therefore, the following detailed description is not meant to limit the invention. Rather, the scope of the invention is defined by the appended claims.

It would be apparent to one of skill in the art that the present invention, as described below, may be implemented in many different embodiments of hardware, software, firmware, and/or the entities illustrated in the figures. Any actual software code with specialized controlled hardware to implement the present invention is not limiting of the present invention. Thus, the operation and behavior of the present invention will be described with the understanding that modifications and variations of the embodiments are possible, given the level of detail presented herein.

Figure 1:
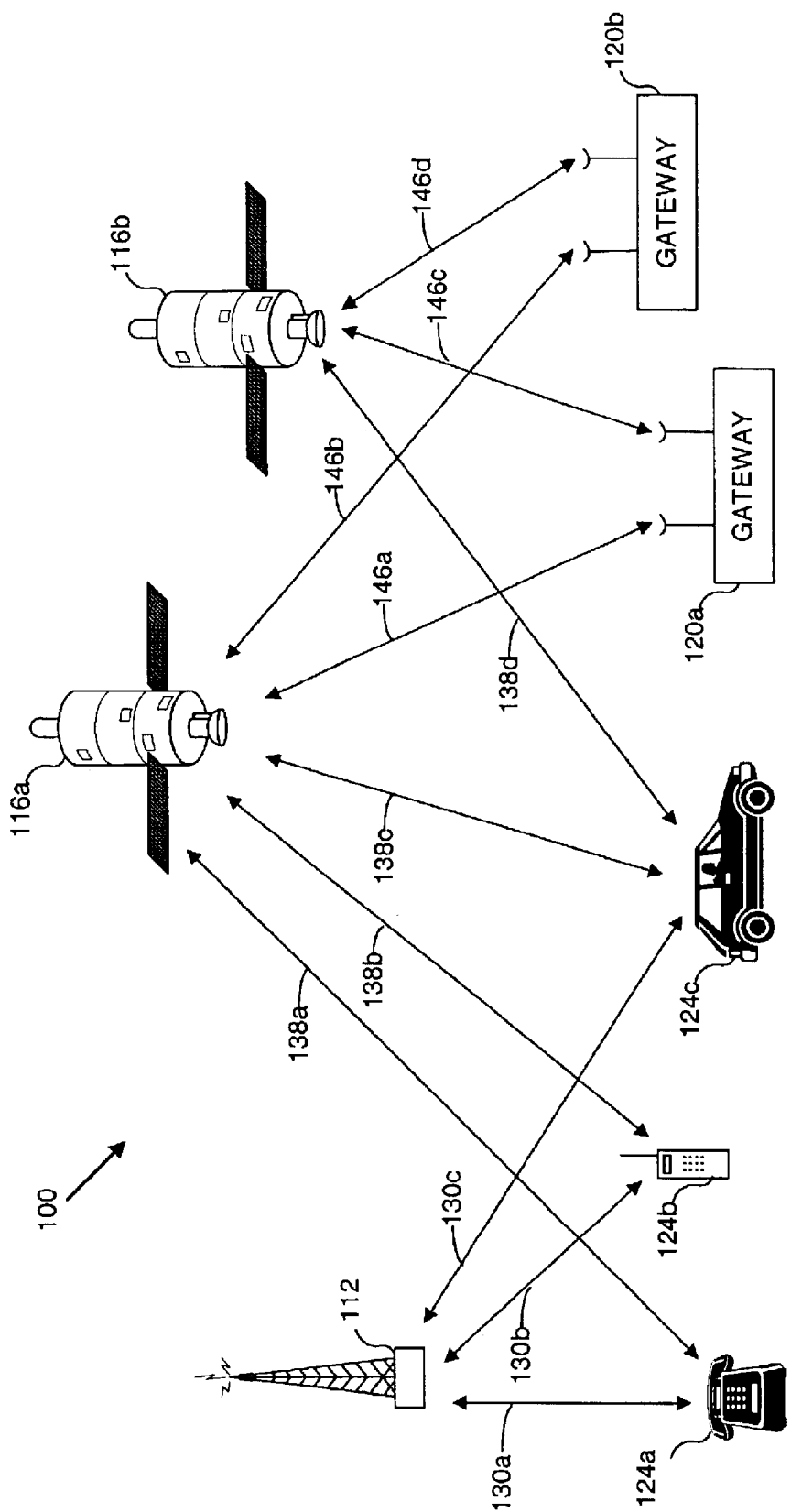
FIG. 1 illustrates an exemplary wireless communication system.

Before describing the invention in detail, it is helpful to describe an example environment in which the invention may be implemented. The present invention is particularly useful in mobile communications environments. FIG. 1 illustrates such an environment.

FIG. 1 is a block diagram of an exemplary wireless communication system (WCS) 100 that includes a base station 112, two satellites 116a and 116b, and two associated gateways (also referred to herein as hubs) 120a and 120b. These elements engage in wireless communications with user terminals 124a, 124b, and 124c. Typically, base stations and satellites/gateways are components of distinct terrestrial and satellite based communication systems. However, these distinct systems may interoperate as an overall communications infrastructure.

Although FIG. 1 illustrates a single base station 112, two satellites 116, and two gateways 120, any number of these elements may employed to achieve a desired communications capacity and geographic scope. For example, an exemplary implementation of WCS 100 includes 48 or more satellites, traveling in eight different orbital planes in Low Earth Orbit (LEO) to service a large number of user terminals 124.

The terms base station and gateway are also sometimes used interchangeably, each being a fixed central communication station, with gateways, such as gateways 120, being perceived in the art as highly specialized base stations that direct communications through satellite repeaters while base stations (also sometimes referred to as cell-sites), such as base station 112, use terrestrial antennas to direct communications within surrounding geographical regions.

User terminals 124 each include a wireless communication device such as, but not limited to, a cellular telephone, a data transceiver, or a paging or position determination receiver. Furthermore each of user terminals 124 can be hand-held, vehicle-mounted or fixed. For example, FIG. 1 illustrates user terminal 124a as a fixed telephone, user terminal 124b as a hand-held portable device, and user terminal 124c as a vehicle-mounted device.

User terminals 124 engage in wireless communications with other elements in WCS 100 through CDMA communications systems. However, the present invention may be employed in systems that employ other communications techniques, such as time division multiple access (TDMA), and frequency division multiple access (FDMA).

Generally, beams from a beam source, such as base station 112 or satellites 116, cover different geographical areas in predefined patterns. Beams at different frequencies, also referred to as CDMA channels or 'sub-beams', can be directed to overlap the same region. It is also readily understood by those skilled in the art that beam coverage or service areas for multiple satellites, or antenna patterns for multiple base stations, might be designed to overlap completely or partially in a given region depending on the communication system design and the type of service being offered, and whether space diversity is being achieved.

FIG. 1 illustrates several exemplary signal paths. For example, communication links 130a–c provide for the exchange of signals between base station 112 and user terminals 124. Similarly, communications links 138a–d provide for the exchange of signals between satellites 116 and user terminals 124. Communications between satellites 116 and gateways 120 are facilitated by communications links 146a–d.

User terminals 124 are capable of engaging in bi-directional communications with base station 112 and/or satellites 116. As such, communications links 130 and 138 each include a forward link and a reverse link. A forward link conveys information signals to user terminals 124. For terrestrial-based communications in WCS 100, a forward link conveys information signals from base station 112 to a user terminal 124 across a link 130. A satellite-based forward link in the context of WCS 100 conveys information from a gateway 120 to a satellite 116 across a link 146 and from the satellite 116 to a user terminal 124 across a link 138. Thus, terrestrial-based forward links typically involve a single wireless connection, while satellite-based forward links typically involve two wireless connections.

In the context of WCS 100, a reverse link conveys information signals from a user terminal 124 to either a base station 112 or a gateway 120. Similar to forward links in WCS 100, reverse links typically require a single wireless connection for terrestrial-based communications and two wireless connections for satellite-based communications. WCS 100 may feature different communications offerings across these forward links, such as low data rate (IDR) and high data rate (HDR) services. An exemplary LDR service provides forward links having data rates from 3 kilobits per second (kbps) to 9.6 kbps, while an exemplary HDR service supports data rates as high as 604 kbps.

HDR service may be bursty in nature. That is, traffic transferred across HDR links may suddenly begin and end in an unpredictable fashion. Thus, in one instant, an HDR link may be operating at zero kbps, and in the next moment operating at a very high data rate, such as 604 kbps.

As described above, WCS 100 performs wireless communications according to CDMA techniques. Thus, signals transmitted across the forward and reverse links of links 130, 138, and 146 convey signals that are encoded, spread, and channelized according to CDMA transmission standards. In addition, block interleaving is employed across these forward and reverse links. These blocks are transmitted in frames having a predetermined duration, such as 20 milliseconds.

Base station 112, satellites 116, and gateways 120 may adjust the power of the signals that they transmit across the forward links of WCS 100. This power (referred to herein as forward link transmit power) may be varied according to user terminal 124 and according to time. This time varying feature may be employed on a frame-by-frame basis. Such power adjustments are performed to maintain forward link bit error rates (BER) within specific requirements, reduce interference, and conserve transmission power.

For example, gateway 120a, through satellite 116a, may transmit signals to user terminal 124b, such as a mobile phone, at a different forward link transmission power than it does for user terminal 124c. Additionally, gateway 120a may vary the transmit power of each of the forward links to user terminals 124b and 124c for each successive frame.

Figure 2:
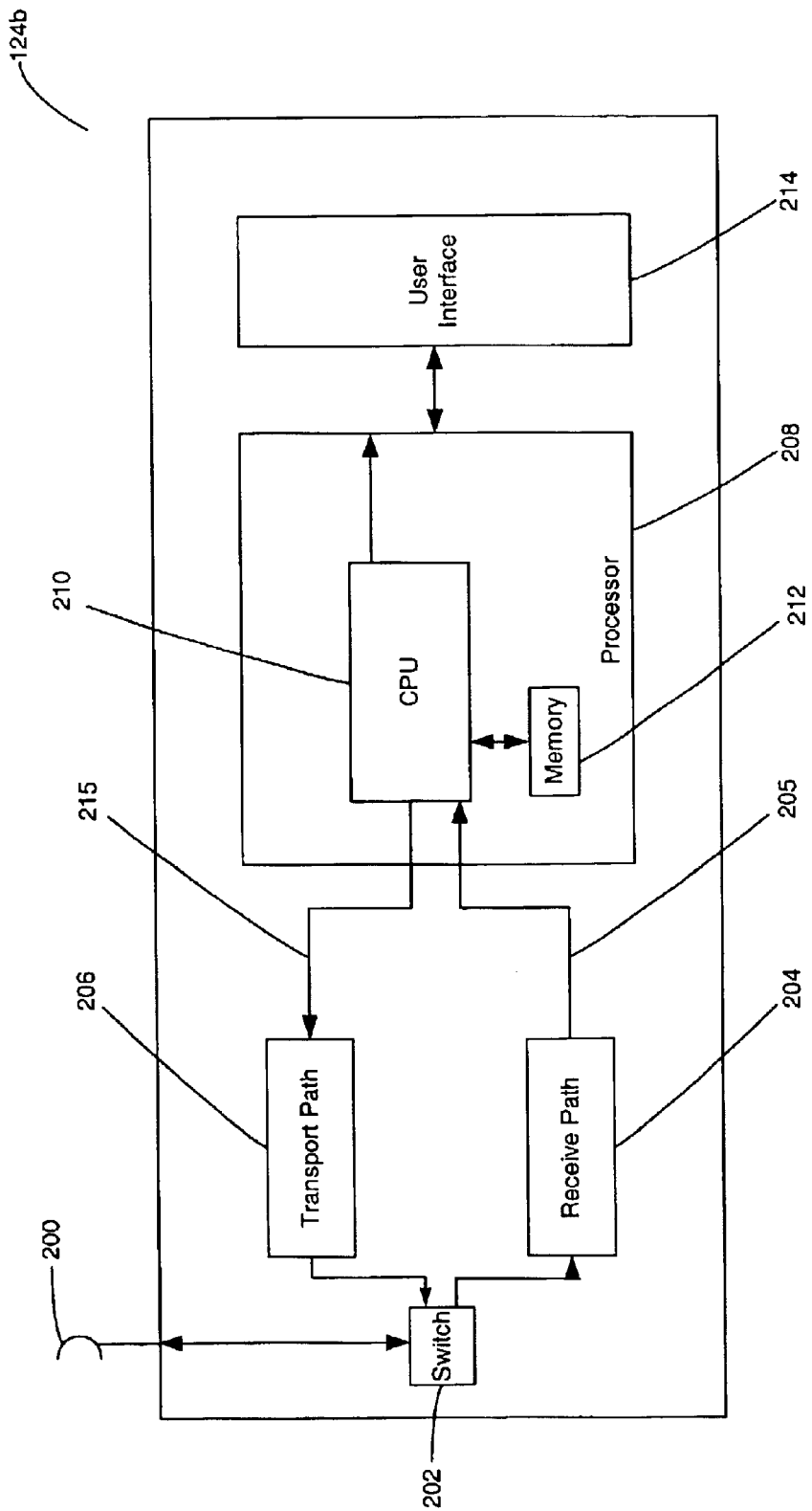
FIG. 2 is a block diagram illustration of the mobile communications terminal 124b shown in FIG. 1.

FIG. 2 is a block diagram of the exemplary mobile phone 124b shown in FIG. 1. The mobile phone 124b includes an antenna 200 coupled to an antenna switch 202. Also included is a receive path 204 with an input coupled to the antenna switch 202 and a transmit path 206 having an output also coupled to the antenna switch 202. The antenna switch 202 switches the antenna 200 between input and output modes respectively associated with the receiver 204 and the transmitter 206. The antenna 200 receives and forwards radio frequency signals to the receive path 204 in conventional manner. The mobile phone 124b also includes a processor 208 comprising a CPU 210 and a memory 212. The CPU 210 receives input signals via the receive path 204 and processes those signals in accordance with an appropriate signaling standard and instructions stored in the memory 212.

Finally, a user interface 214, which can include a display panel and/or a keyboard, is also provided. The CPU 210 provides an output signal along a reverse-link path 215, to the transmit path 206 for transmission across a wireless communications link via the antenna 202. As discussed above, in order for the mobile phone 124b to obtain access to the communications network, it must first receive the pilot signal transmitted by the base station 112. Next, it must receive and demodulate the associated system's synchronization channel. After the synchronization channel has been demodulated, the mobile phone 124b can gain access to the synchronization message and other pertinent information required for system use.

Figure 3A:
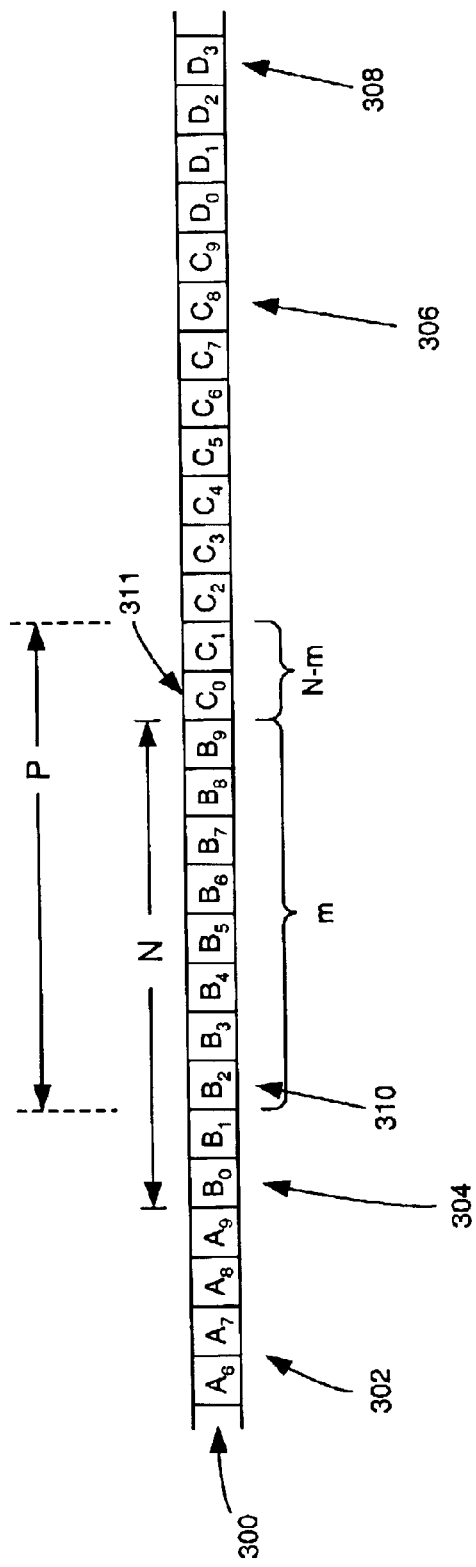
FIG. 3a is an illustration of an exemplary data stream produced by the terminal of FIG. 2.

In FIG. 3A, a data stream 300, transmitted by the WCS 100 via the base station 112, includes portions of a number of different synchronization messages transmitted at different times. A portion of a synchronization message 302 includes data frames labeled as ($A_0$–$A_9$), a synchronization message 304 includes data frames labeled as ($B_0$–$B_9$), a synchronization message 306 includes data frames labeled as ($C_0$–$C_9$), and a portion of a synchronization message 308 includes data frames labeled as ($D_0$–$D_3$). The synchronization message 304 includes a starting point 310 at which the mobile phone 124b, and thus the processor 208, begins to receive the data stream 300. Additionally, the synchronization message 306 includes a start-of-message bit indicating a start of the message 306 within its associated data frame 311. Although the present invention is described with reference to an exemplary synchronization channel and associated synchronization message, the present invention is not limited to such a configuration. The present invention may be practiced with regard to any communications channel or process that includes receiving periodic messages that include data frames containing one or more constant fields.

When the mobile phone 124b is initially powered-up, its processor 208 must be synchronized with the data frame structure of the WCS 100. Since its initially unsynchronized, the first frame the processor 208 receives will not necessarily be the first frame of any of the messages 302, 304, 306, and 308 in the data stream 300. Using conventional approaches, processors typically examine successively received frames until a start-of-a message (SOM) indication is received, such as the SOM indication within the frame 311 of the synchronization message 306. However, if the first data frame received by the processor was not at the beginning of a message, as in the case of the data frame 310 of the synchronization message 304, synchronization would not occur at that time. Subsequently, if the first data frame the processor 208 receives is the data frame 310, it will search through the data stream 300 to find an SOM bit within the data frame 311.

After locating the SOM bit, the processor 208 must then receive all of the subsequent data frames ($C_0$–$C_9$) associated with the synchronization message 306. After receiving all of the data frames ($C_0$–$C_9$), the processor 208 can properly read the associated data fields, decode the message, and subsequently obtain synchronization. That is, the subsequent frames must be accumulated until the entire message 306 has been received.

If there were (N) frames in a message, then in an error-free environment, between N and (N−1)+N frames must be received in order to assemble a complete message. This results in an average of (3N−1)/2 frames to receive the message. Since (N) frames must be received for a complete message, this approach has an average penalty of (N−1)/2 frames. Therefore, the requirement to accumulate subsequent frames until the entire message has been received, is somewhat inefficient and time-consuming.

The present invention, however, eliminates the need to collect all of the frames from an entire message before synchronization can be achieved. Alternatively, the present invention facilitates a more efficient process of combining message fragments from successive messages to hasten synchronization. Here, the processor 208 of the mobile phone 124b begins receiving frames in the manner discussed above. As shown in FIG. 3A, after (m) frames of the data stream 300 have been collected, the frame 311 containing the SOM bit will be received. Also as shown in FIG. 3A, a complete message requires the collection of a total of (N) frames.

In the present invention, unlike the conventional techniques discussed above, the total number of required frames (N) can be represented by (m) frames from an initial message, plus (N−m) frames from a next message. That is, all of the frames need not occur in the same message, but can be derived from different message fragments, as represented by (P). For purposes of discussion herein, the initial message (304) will be referred to as the first message fragment and the next message (306) will be referred to as the second message fragment.

Figure 3B:
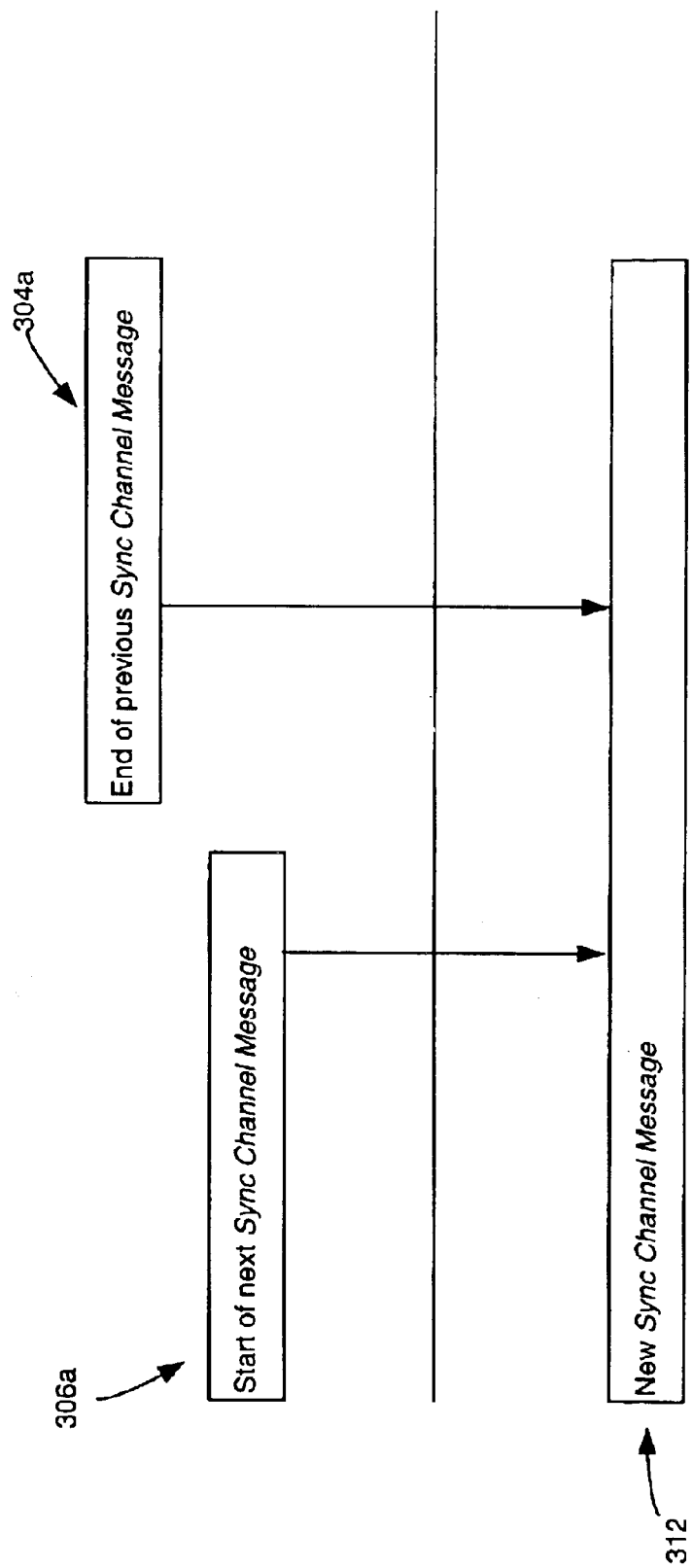
FIG. 3b is an illustration of applying an exemplary synchronization timing scheme.

From the first and the second message fragments, it will be possible to synthetically construct an entire message, such as an inferred, or new, synch channel message 312 shown in FIG. 3B. As shown in FIG. 3B, if error-checking information is at the end of a message, then the frames from the second message fragment, shown as 306a will be moved into the first message fragment 304a. In other words, the frames shown as (N−m) of the message 306 in FIG. 3A will be moved to a beginning portion of the new synch channel message 312. Similarly, an end portion shown as (m) of the synch channel message 304, also called the "previous synch channel message," will be moved to an end portion of the new synch channel message 312. Some data fields may require conversion before being moved, or copied, into other frames. This process is discussed in greater detail below. An exemplary construction process is illustrated in FIG. 4.

Figure 4:
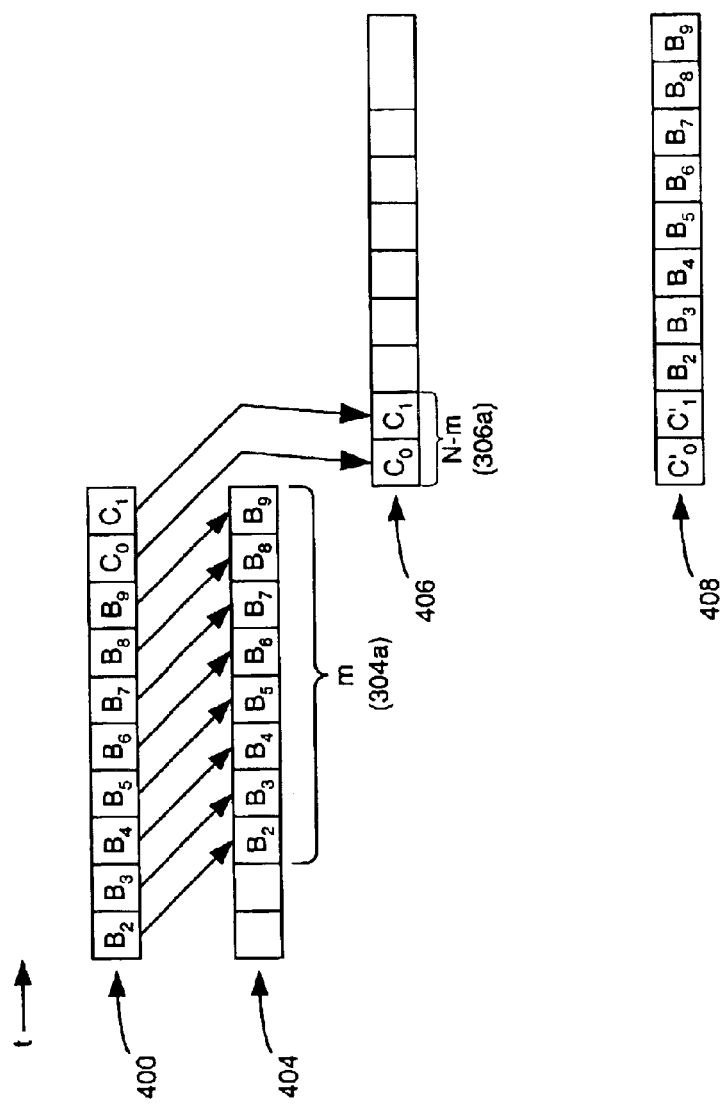
FIG. 4 is a block diagram representation of an exemplary message fragment.

In FIG. 4, a data register 400 is included in the processor 208 and is configured to receive a portion of the data stream 300 as time progresses along a timeline (t). In FIG. 4, the portion (P) of the data stream 300, shown in FIG. 3A, is stored in the data register 400. In order to construct the new synch channel message 312, the first and second message fragments are combined in the register 400. Next, a data register 404 includes the message fragment 304a, which is formed of the last eight frames from the message 304. Similarly, a register 406 includes the fragment 306a, which is formed of the first two frames from the message 306.

In order to combine the message fragments 304a and 306a, either the fragment 304a must be moved from the register 404 and appended to the contents of the register 406 or the fragment 306a must be removed from register 406 and appended to the contents of the register 404. As a solution, the inventors of the present invention have discovered that if error-checking information is contained at the end of any first message fragment, such as the fragment 304a, then the frames from a successive synch channel message fragment, such as the fragment 306a, should be moved into the first message fragment. In IS-95-A, CDMA2000, and W-CDMA, error checking is traditionally performed at the end of the message. Therefore, the data frames from the message fragment 306a are added to the beginning of the first message fragment 304a.

A resulting new synch channel message 312 is therefore formed in a data register 408 by prepending the converted message fragment 306a to the message fragment 304a. The data register 408 includes data frames $C'_0$ and $C'_1$, representative of modifications to the data frames $C_0$ and $C_1$, respectively. If, on the other hand, the error checking information had been contained at the start of the message, the converted message fragment 304a would have been appended to the fragment 306a. A detailed view of a conventional message and frame structure is shown in FIG. 5.

In FIG. 5, a conventional synchronization message 500 is shown and includes three superframes 501 formed from nine individual frames 502. Each of the individual frames 502 includes an SOM bit 503 within its frame body 504. As stated above, and shown in relation to FIG. 3A, the message 306 includes an SOM bit at the beginning of the frame 311. During operation of the present invention, an incoming data stream, such as the exemplary data stream 300, is analyzed. From this analysis, a complete message is constructed from the partially received messages contingent in-part on the location of the SOM bit. Each message also includes a number of predetermined data fields 506 that provide specific information for use by the mobile phone 124b in acquiring, achieving synchronization, and maintaining communication within the WCS 100. Each of the data fields 506 includes a specific data field value. The data field value is ultimately determinative of the ease at which frames can be combined to form complete messages.

Data frames including constant data field values may be copied directly from one message to the other without further manipulation. As shown in FIG. 5, many of the data field values are indicated as being constant. Although constant fields may be copied directly from one message to the other, non-constant fields require value adjustments to determine the required value for the field in the previous or next message, depending on the direction the associated frames are being moved. Once frames from different messages are combined to form a complete message, an error-checking algorithm will then be run on the new synthesized message to verify that it is indeed a valid message. Although many of the field values are constant, several of the field values are indicated as being variable and consequently require processing of varying degrees of complexity before they can be copied to another message.

As illustrated in FIG. 5, some message fields are variable and require complex processing before copying, while others are variable but are relatively simple to process. Even further, some field values, such as the cyclic redundancy check (CRC), are variable and require extremely complex processing before they can be copied from one message to another. The CRC, for example, is varied, not in a simple fashion, but in a complex pseudo-random manner. FIG. 6 provides an even greater detailed illustration of the particular message fields 506 associated with the sync channel message data frames.

A significant benefit of the present invention is that it takes exactly (N) frames to receive a message of (N) frame length, regardless of the point in the message that frame reception began. Thus, the average penalty of the present technique is zero, which is an improvement of (N−1)/2 frames over the conventional approaches. The situation becomes even more complex when a non-constant message field spans a message frame boundary, such as the CRC and long-code state field values shown in FIG. 5. As shown, each of these variable field values extends across the boundaries of the frames 502. If the process for adjusting the field value is a simple operation, it may be possible to adjust the value despite part of the field being contained in more than one frame. An exemplary adjustment technique is discussed below.

Certain fields, although non-constant in value, may increase by a constant value each successive message. One such field is system time, shown in FIG. 5 as SYS_TIME. Assume, for purposes of illustration, that the first message fragment contains the least significant bits of the SYS_TIME field, and the second message fragment contains the most significant bits. To determine the field's value in the second message, the constant value should be added to the least significant bits from the first message, ignoring any overflow into the most significant bits. The most significant bits of the result should be set to the most significant bits from the second message fragment. To determine the field's value in the first message, the constant value may be subtracted from the field value in the second message, as shown in Equations (A)–(C) below:

Eq.(A):

$$\begin{array}{r} x\ x\ x\ 7\ 8\ 9 \\ +\quad 1\ 2\ 3\ 4 \\ \hline 3\ 4\ 5\ Y\ Y\ Y \end{array}$$ from first message fragment
increase in value from one message to the next
from second fragment Eq.(B):

$$\begin{array}{r} 7\ 8\ 9 \\ +\quad 1\ 2\ 3\ 4 \\ \hline ?\ ?\ ?\ 0\ 2\ 3 \end{array}$$ thus YYY = 023, and the second message's field value must be 345023

EQ.(C):

$$\begin{array}{r} 3\ 4\ 5\ 0\ 2\ 3 \\ -\quad\ 1\ 2\ 3\ 4 \\ \hline 3\ 4\ 3\ 7\ 8\ 9 \end{array}$$ the first message's field value must be 343789

If, on the other hand, the operation for adjusting the field value from one message to the next is not a simple operation, and the field crosses one or message frame boundaries, it may be simpler to wait until all of the bits in the field have been accumulated. This invention assumes, therefore, that there are constant fields in the message. These fields do not have to be truly constant, but merely infrequently changing. If a constant field's value changes from one message to the next, the error-detection procedure will determine that the synthesized message is not a valid message. In this case, the additional message frames will be required, and the process will repeat until a valid message can be synthesized or a complete message is received. In other words, the average penalty for changing an otherwise constant field in the message is the same as the original method stated above. Therefore, use of the invention does not result in any greater degradation, even during a worst-case scenario than using traditional methods.

Of the data fields shown in FIG. 6, only LC_STATE, SYS_TIME, and CRC change with each successive synch channel message. The SYS_TIME and LC_STATE fields change in a predictable fashion from one synch channel message to the next. For example, the SYS_TIME field, which is in units of 80 milliseconds (ms), is increased by 3 each message, corresponding to a total of 240 ms. The CRC field, however, does not change in any easily determined fashion. The remaining fields are effectively constant. For example, the DAYLT field will only change twice in over 100 million synch channel messages.

If the synchronization channel decoding starts in the middle of a synch channel message, the synch channel frame's SOM bits will be zero because only the frame depicting the start of the message has its bit set. Eventually, the synch channel message will end, and the next one will begin. This is signaled by a synch channel frame with its SOM bit set to 1. At this point, the MSG_LENGTH field can be examined to determine the length of the synch channel message. The frames immediately before the frame with the SOM bit set to 1 may be pure padding frames, containing no useable information, and may be ignored. The synch channel message length can be expressed in the following manner:

| | |
|---|---|
| in bytes: | B = MSG_LENGTH |
| in frames: | F = [MSG_LENGTH * 8/31] |
| in superframes: | SF = [MSG_LENGTH * 8/93] |

The frames immediately before the frame with the SOM bit set to one may be "pure padding" frames containing no useful information.

Figure 7:
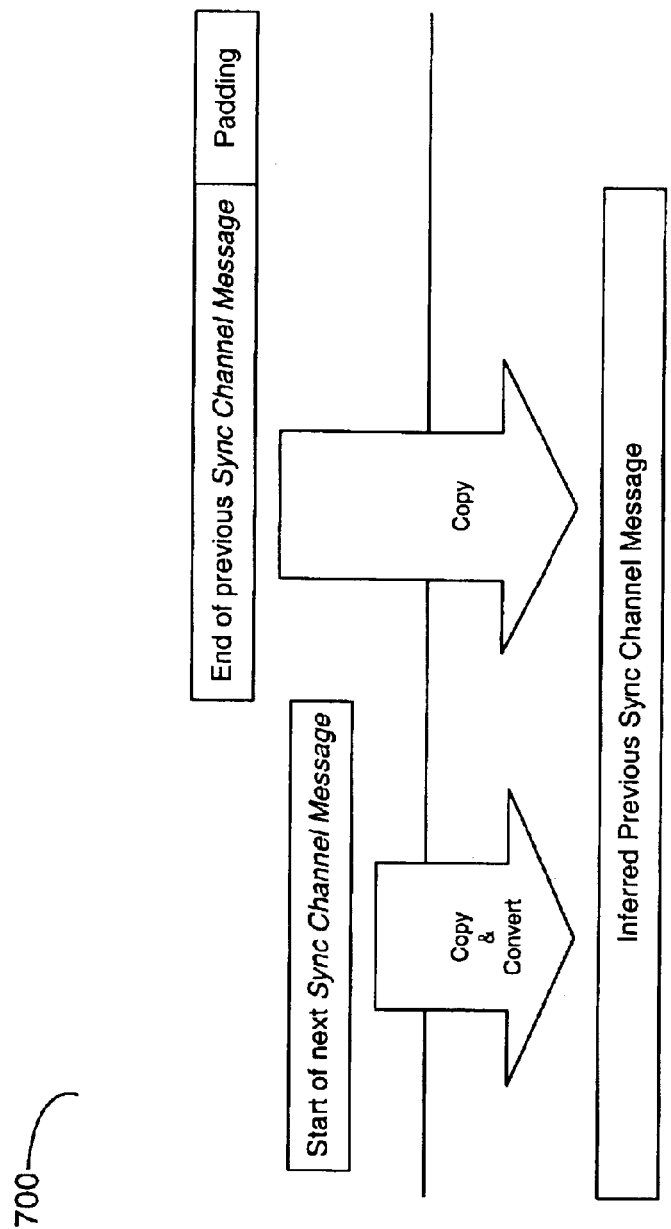
FIG. 7 is a more detailed illustration of the example of FIG. 3B.

"Pure padding" frames at end of Sync Channel Message Capsule:
   in frames: PF=3*SF-F After "F" frames have been received on the sync channel, ignoring any pure padding frames, the end of one sync channel message and the beginning of the next will have been received. From these, a complete sync channel message may be constructed as shown in the example 700 of FIG. 7.

The constant fields from the next synch channel message fragment can be copied directly to the start of the previous synch channel message. The non-constant fields, SYS_TIME and LC_STATE, will need to be converted as they are copied. The SYS_TIME field will need to be decreased by a predetermined amount, the number of superframes in the synch channel message. The LC_STATE field will need to be backed up by about 3×SF PN rolls (3*SF*32768 steps). At this point, the CRC for the inferred synch channel message can be computed. If the CRC check passes, then the message can be assumed to be correct. If the CRC fails, then bit errors are present, or one or more of the constant fields must have changed. Subsequent synch channel frames can overwrite the previous frames until either the CRC of the inferred message passes or enough frames have been collected to complete the next synch channel message.

If all of the SYS_TIME field bits are from the next synch channel message fragment, then computing what the value of the field would have been in the previous message is straightforward. If some of the least significant bits are from the previous message, and the most significant bits are from the next message, then conversion is more involved but still possible, as discussed above.

If, for example, all of the LC_STATE field bits are from the next synch channel message fragment, then the LC_STATE for the previous message can be computed by a polynomial division by 3*SF*32768. Alternately, due to the cyclical nature of the long code, this can also be computed by an advance (polynomial multiplication) of $(2^{42}-1)-(3*SF*32768)$. If all the LC_STATE bits are not contained in either message fragment, computation of the required long code state will be more difficult. In this case, more synch channel frames must be collected until all LC_STATE bits are from the same message fragment.

Conversion of the CRC bits from the next synch channel message fragment to the previous synch channel message fragment is not possible. However, when all the CRC bits are collected from the next synch channel message fragment, this is no longer a message fragment, but rather a complete message and can be processed as such.

Figure 8:
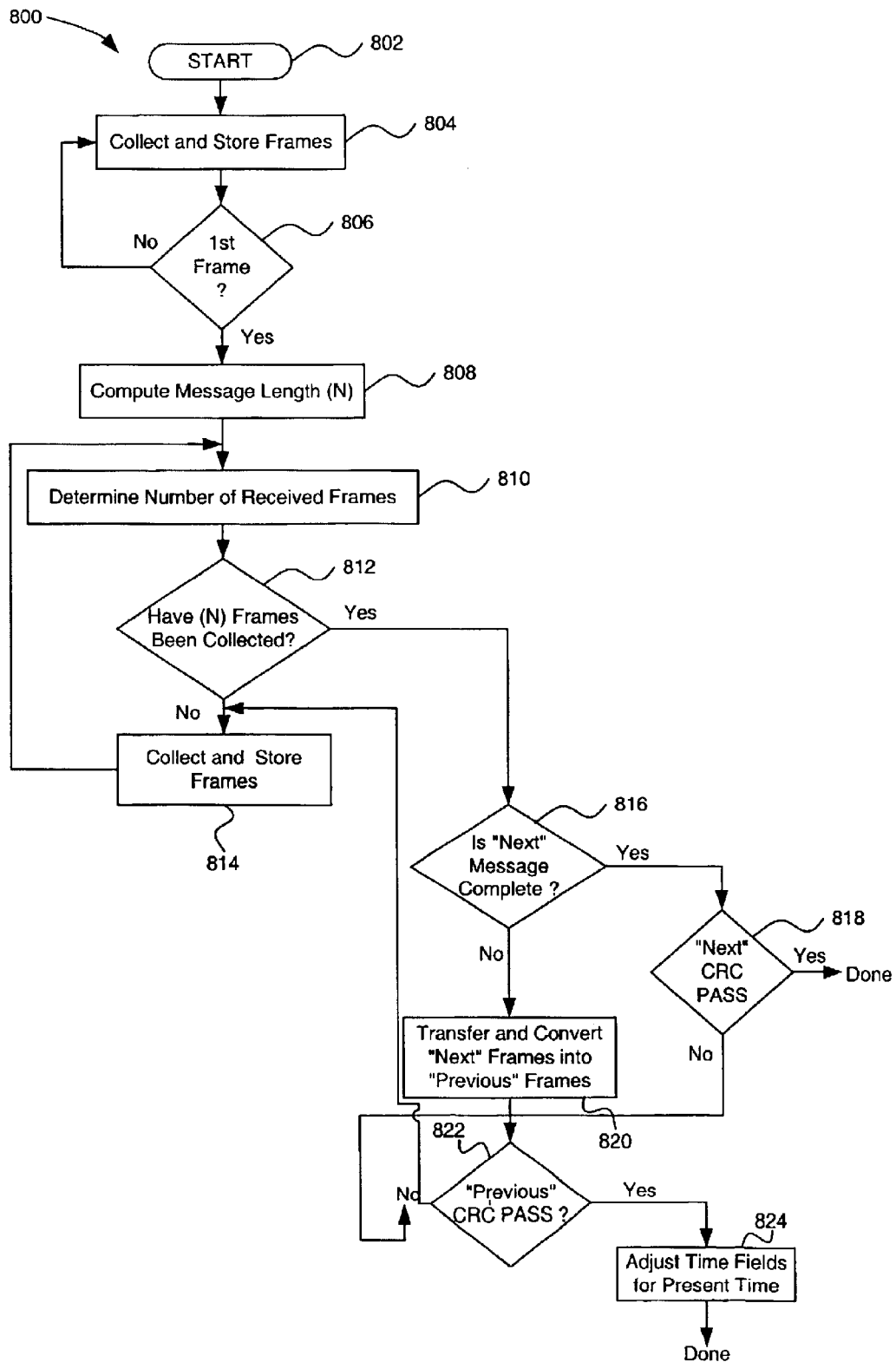
FIG. 8 is an exemplary method of practicing the present invention.

FIG. 8 provides a detailed illustration of an exemplary method of practicing the present invention. In FIG. 8, a flowchart 800 is provided to present a detailed illustration of an exemplary method of practicing the present invention. In block 802, a user begins the process by activating the mobile phone 124b. In a block 804, data frames, transmitted via synchronization messages associated with the WCS 100, are collected and stored in the register 400 of the processor 208, as illustrated in FIGS. 2 and 4.

Next, in block 806, the processor 208 determines whether a first message frame, such as the first frame 311 shown in FIG. 3A, has been collected. If a first frame has been collected, as evidenced by inspection of the SOM bit, then the processor 208 computes the message length, as depicted in block 808. For example, in FIG. 3A, the message length is shown to be 10 frames. If on the other hand a first frame has not been collected, the processor 208 continues to collect and store frames as shown in block 804. After the message length (N) has been computed, the total number of received frames (P) is determined in block 810.

Next, the processor 208 determines whether (N) frames have been collected and stored as depicted in block 812. If (N) frames have not been collected and stored, the processor 208 again collects and stores additional frames, as shown in block 814, and the process returns to block 810. If (N) frames have been collected, the processor 208 determines whether the (N) collected frames form a complete next message as depicted in block 816. If a complete next message has been formed, the processor 208 determines whether the CRC passes as indicated in block 818. If the CRC passes, the process is completed, the next message is formed and may be decoded to facilitate synchronization. If on the other hand however, the number of collected (N) frames do not all belong to the next message, as illustrated in the example of FIG. 4, the collected next frames are transferred and converted into the previous frames described in block 820 of FIG. 7.

Once the frames have been transferred to the previous message, by mere copying or copying and conversion, the processor 208 determines whether the CRC of the previous message has passed, as shown in block 822. If the CRC passes, the field values are adjusted in accordance with present time values as described above and as illustrated in block 824. The process then finishes with formation of a next, or new, message as stored in the register 408 of FIG. 4. If the previous message CRC 822 does not pass, then the processor 208 continues to collect and store data frames.

CONCLUSION

By accelerating the synchronization process, the amount of time a remote unit, such as the mobile phone 124b is out of service, is reduced. Additionally, mobile phone 124b can operate in a lower power mode once synchronization has been achieved and power savings can be realized. Thus, by using the present invention, the latency created when the decoding of the sync channel message does not begin at the start of the message can be reduced. The technique of the present invention therefore provides a savings of about 300 milliseconds for each synchronization cycle.

The foregoing description of the preferred embodiments provides an illustration and description, but is not intended to be exhaustive or to limit the invention to the precise form disclosed. Modifications and variations are possible consistent with the above teachings, or may be acquired from practice of the invention.

What we claim is:

1. A method of constructing a data message in a communications device including a processor configured to process sequentially transmitted messages, each message requiring a predetermined number of data frames, the data frames of each transmitted message corresponding to the data frames in the other transmitted messages, the method comprising:

receiving portions of at least two of the transmitted messages in the processor, each of the at least two received portions (i) including a subset of the predetermined number of data frames and (ii) excluding a remainder of the predetermined number of data frames, wherein the subset of one of the received portions substantially matches the remainder of the other portion;

determining whether a total number of the received subsets equals the predetermined number; and producing a synthesized message when the total number of the subsets is at least equal to the predetermined number, the synthesized message being formed of a combination of the subsets from each of the received portions.

2. The method of claim 1, wherein the messages are formatted in accordance with at least one of a IS-95-A, IS-95-B, IS-2000, and W-CDMA standard.

3. The method of claim 2, wherein the messages are transmitted in an overhead channel.

4. The method of claim 3, wherein the overhead channel is a synchronization channel.

5. The method of claim 1, wherein all of the data frames include an associated field value.

6. The method of claim 5, wherein the associated field value is one of a constant value and a variable value.

7. The method of claim 6, further comprising adjusting one or more of the variable field values.

8. The method of claim 1, wherein the data frames are substantially contiguous frames.

9. A computer readable medium carrying one or more sequences of one or more instructions for execution by one or more processors, the instructions when executed by the one or more processors, cause the one or more processors to perform the steps of:

receiving at least two of the transmitted messages, each of the at least two received portions (i) including a subset of the predetermined number of data frames and (ii) excluding a remainder of the predetermined number of data frames, wherein the subset of one of the received portions substantially matches the remainder of the other portion;

determining whether a total number of the received subsets equals the predetermined number; and producing a synthesized message when the total number of the subsets is at least equal to the predetermined number, the synthesized message being formed of a combination of the subsets from each of the received portions.

10. The computer readable medium of claim 9, wherein the messages are formatted in accordance with at least one of IS-95A, IS-95B, IS-2000, and W-CDMA.

11. The computer readable medium of claim 10, wherein the messages are transmitted in an overhead channel.

12. The computer readable medium of claim 11, wherein the overhead channel is a synchronization channel.

13. The computer readable medium of claim 9, wherein all of the data frames include an associated field value.

14. The computer readable medium of claim 13, wherein the associated field value is one of a constant value and a variable value.

15. The computer readable medium of claim 14, further comprising adjusting one or more of the variable field values.

16. The computer readable medium of claim 9, wherein the data frames are substantially contiguous frames.

17. An apparatus comprising:
a receiving mechanism configured to receive a communications signal and extract communication messages therefrom, each of the communications messages requiring a predetermined number of data frames;
wherein the data frames of each transmitted message correspond to the data frames in the other of the transmitted messages;
a processor electrically coupled to the receiving mechanism and configured to receive portions of at least two of the communication messages, each of the at least two received portions (i) including a subset of the predetermined number of data frames and (ii) excluding a remainder of thee predetermined number of data frames, the subset of one of the at least two received portions substantially matching the remainder of the other of the at least two received portions;
wherein the processor (ii) determines whether a total number of the received subsets equals the predetermined number and (ii) produces a synthesized message when the total number of the subsets is at least equal to the predetermined number, the synthesized message being formed of a combination of the subsets from each of the received portions.

18. The apparatus of claim 17, wherein the apparatus is a data communications terminal.

19. The apparatus of claim 18, wherein the data communications terminal is at least one of a mobile phone and a base station.

20. The apparatus of claim 18, wherein the data communications terminal is configured in accordance with at least one signaling standard from the group including IS-95A, IS-95B, IS-2000, and W-CDMA.

21. The method of claim 20, wherein all of the data frames include an associated field value.

22. The method of claim 21, wherein the associated field value is one of a constant value and a variable value.

23. The method of claim 22, further comprising adjusting one or more of the variable field values.

24. The method of claim 18, wherein the data frames are substantially contiguous frames.

25. A method of constructing a data message in a communications device including a processor, the processor being configured to process sequentially transmitted messages, each message requiring a predetermined number of data frames, the data frames of each transmitted message corresponding to the data frames in the other transmitted messages, the method comprising:
collecting a first number of the data frames in the processor, the first number of collected data frames being representative of a portion of a first of the sequentially transmitted messages;
collecting at least a second number of the data frames in the processor, the at least second number of data frames (i) being collected subsequent to the first number of collected data frames and (ii) being representative of a portion of a second of the sequentially transmitted messages;
detecting a start message frame from among the second number of collected data frames;
determining a length of the second transmitted message when the start message frame is detected;
determining whether a total number of first and second collected data frames has equaled the predetermined number of data frames;
determining whether the second number of data frames has equaled the predetermined number of data frames if the total number of data frames has equaled the predetermined number; and
adjoining the collected first and second number of data frames if the second number of data frames has not equaled the predetermined number of data frames.

26. The method of claim 25, wherein all of the data frames include an associated field value.

27. The method of claim 26, wherein the associated field value is one of a constant value and a variable value.

28. The method of claim 27, further comprising adjusting one or more of the variable field values.

29. The method of claim 25, wherein the first and second collected messages are stored in respective first and second memory locations; and
wherein the collected first and second number of data frames are adjoined in only one of the first and second memory locations.

30. The method of claim 25, wherein the transmitted messages are formatted in accordance with at least of IS-95A, IS-95B, IS-2000, and W-CDMA.

31. The method of claim 30, wherein the messages are transmitted in an overhead channel.

32. The method of claim 31, wherein the overhead channel is a synchronization channel.

33. The method of claim 32, wherein the collected first and second number of data frames are respectively substantially contiguous frames.

34. An apparatus including a processor adapted to process sequentially transmitted messages, each message requiring a predetermined number of data frames, the data frames of each transmitted message corresponding to the data frames in the other transmitted messages, the system comprising:
a first register configured to collect a first number of the data frames, the first number of collected data frames being representative of a portion of the first transmitted message;
a second register configured to collect at least a second number of the data frames, the at least second number of data frames (i) being collected subsequent to the first number of collected data frames and (ii) being representative of a portion of the second transmitted message;
wherein the processor is (i) configured to detect a start message frame from among the second number of collected data frames, (ii) determine a length of the second transmitted message when the start message frame is detected, (iii) determine whether a total number of first and second collected data frames has equaled the predetermined number of data frames, (iv) determine whether the second number of data frames has equaled the predetermined number of data frames if the total number of data frames has equaled the predetermined number, and (v) adjoin the collected first and second number of data frames if the second number of data frames has not equaled the predetermined number of data frames.

35. The apparatus of claim 34, wherein the apparatus is a communications device.

36. The apparatus of claim 35, wherein the communications device is at least one of a mobile phone and a base station.

37. The apparatus of claim 34, wherein all of the data frames include an associated field value.

38. The apparatus of claim 37, wherein the associated field value is one of a constant value and a variable value.

39. The apparatus of claim 38, further comprising adjusting one or more of the variable field values.

40. The apparatus of claim 34, wherein the first and second collected messages are stored in respective first and second memory locations; and wherein the collected first and second number of data frames are adjoined in only one of the first and second memory locations.

41. The apparatus of claim 34, wherein the transmitted messages are formatted in accordance with at least one of a IS-9-A, IS-9-B, IS-2000, and W-CDMA standard.

42. The apparatus of claim 41, wherein the messages are transmitted in an overhead channel.

43. The apparatus of claim 42, wherein the overhead channel is a synchronization channel.

44. The apparatus of claim 43, wherein the collected first and second number of data frames are respectively substantially contiguous frames.

* * * * *